United States Patent
Onozaki

(10) Patent No.: US 11,908,603 B2
(45) Date of Patent: Feb. 20, 2024

(54) INDUCTOR AND VOLTAGE CONVERTER USING IT

(71) Applicant: Murata Manufacturing Co., Ltd., Kyoto-fu (JP)

(72) Inventor: Norimichi Onozaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 748 days.

(21) Appl. No.: 17/002,644

(22) Filed: Aug. 25, 2020

(65) Prior Publication Data

US 2020/0395160 A1    Dec. 17, 2020

Related U.S. Application Data

(63) Continuation of application No. PCT/JP2019/008524, filed on Mar. 5, 2019.

(30) Foreign Application Priority Data

Mar. 23, 2018  (JP) .................................. 2018-057297

(51) Int. Cl.
H01F 27/28    (2006.01)
H01F 27/22    (2006.01)
H01F 27/08    (2006.01)

(52) U.S. Cl.
CPC ......... *H01F 27/22* (2013.01); *H01F 27/2828* (2013.01); *H01F 27/085* (2013.01)

(58) Field of Classification Search
CPC .... H01F 27/22; H01F 27/2828; H01F 27/085; H01F 17/04; H01F 27/2847; H01F 27/292; H02M 3/155

(Continued)

(56) References Cited

U.S. PATENT DOCUMENTS 5,097,241 A * 3/1992 Smith ................ H01F 27/2876
336/60
8,975,995 B1 * 3/2015 Ikriannikov .......... H01F 27/263
336/200

(Continued)

FOREIGN PATENT DOCUMENTS

JP    2005-064319 A    3/2005
JP    2005-310864 A    11/2005

(Continued)

OTHER PUBLICATIONS

International Search Report issued in PCT/JP2019/008524; dated May 21, 2019.

(Continued)

*Primary Examiner* — Shawki S Ismail
*Assistant Examiner* — Kazi S Hossain
(74) *Attorney, Agent, or Firm* — Studebaker & Brackett PC

(57) ABSTRACT

An inductor which avoids heat generation and heat dissipation problems, and has a reduced resistance component, when used in a voltage converter. An inductor is configured with a pair of outer electrodes disposed on both end portions of an element assembly and electrically connected to end portions of conductors. The conductors are made of a flat-type wire having a rectangular cross section, are placed side by side between the end portions, and include cylindrical winding sections, respectively, in which the flat-type wire in a long side direction of the rectangular cross section is wound the number of turns less than one about a thickness direction intersecting with a length direction connecting the pair of end portions along the thickness direction. A heat-dissipating member includes a portion being a partition between the conductors and a portion exposed on the top of an outer surface of the element assembly.

20 Claims, 4 Drawing Sheets

(58) Field of Classification Search
USPC .......................................... 336/61, 200, 232
See application file for complete search history.

(56) References Cited

U.S. PATENT DOCUMENTS

| | | | | |
|---|---|---|---|---|
| 2001/0030593 | A1* | 10/2001 | Imada | ................. H01F 17/0013 336/200 |
| 2012/0139683 | A1* | 6/2012 | Salomaki | .............. H01F 27/263 165/177 |
| 2016/0126000 | A1* | 5/2016 | Han | ........................ H01F 27/28 336/220 |
| 2016/0254085 | A1* | 9/2016 | Rai | ........................... H01F 5/00 336/58 |
| 2017/0047155 | A1* | 2/2017 | Yao | ........................ H01F 17/04 |
| 2018/0322995 | A1* | 11/2018 | Kim | ..................... F28D 15/043 |

FOREIGN PATENT DOCUMENTS

| | | | |
|---|---|---|---|
| JP | 2007-311525 | A | 11/2007 |
| JP | 2008-187043 | A | 8/2008 |
| JP | 2011-199098 | A | 10/2011 |
| JP | 2011199098 | A * | 10/2011 |
| JP | 2012-065453 | A | 3/2012 |
| JP | 2014-127637 | A | 7/2014 |
| JP | 2017-195684 | A | 10/2017 |
| JP | 2019-036649 | A | 3/2019 |
| JP | 2019036649 | A * | 3/2019 |
| WO | 2012/101858 | A1 | 8/2012 |
| WO | 2016/208144 | A1 | 12/2016 |

OTHER PUBLICATIONS

International Preliminary Report on Patentability and Written Opinion issued in PCT/JP2019/008524; dated Sep. 29, 2020.

* cited by examiner

INDUCTOR AND VOLTAGE CONVERTER USING IT

CROSS-REFERENCE TO RELATED APPLICATIONS

This application claims benefit of priority to International Patent Application No. PCT/JP2019/008524, filed Mar. 5, 2019, and to Japanese Patent Application No. 2018-057297, filed Mar. 23, 2018, the entire contents of each are incorporated herein by reference.

BACKGROUND

Technical Field

The present disclosure relates to an inductor including a conductor disposed between a pair of end portions of an element assembly on which a pair of outer electrodes are disposed and to a voltage converter using it.

Background Art

An example of an inductor including a plurality of coil conductors for a single component in related art is a coil component disclosed in Japanese Unexamined Patent Application Publication No. 2008-187043.

That coil component includes a first coil part, a second coil part, a middle member, and a shield member. Each of the first and second coil parts includes a drum core and a winding wound around a winding drum of the core. The axes of the winding drums of the cores are parallel with each other, and the middle member is positioned between the first and second coil parts. The shield member is disposed at least partially on an outer-side surface of the winding in each of the first and second coil parts. The middle member can reduce the cross talk between the first and second coil parts.

SUMMARY

In the inductor in related art disclosed in Japanese Unexamined Patent Application Publication No. 2008-187043, however, its resistance component (R component) is not sufficiently reduced, and its temperature rises above a tolerable range if a large current flows. Accordingly, when the above-described inductor in related art is used in a voltage converter such as a DC-to-DC converter for converting voltage between an input voltage and an output voltage, a problem arises in terms of heat generation and heat dissipation. Thus, more reduction in the resistance component in the inductor is needed.

Accordingly, the present disclosure provides an inductor including an element assembly made of an electrical insulating material, a plurality of conductors disposed inside the element assembly and extending between a pair of end portions of the element assembly, and a pair of outer electrodes disposed on the pair of end portions of the element assembly and electrically connected to end portions of the conductors. Each of the plurality of conductors is made of a flat-type wire having a rectangular cross section and includes a cylindrical winding section wound a specific number of turns, and the plurality of conductors are connected in parallel with each other.

The present disclosure provides a voltage converter for converting voltage between an input voltage and an output voltage. The voltage converter includes an LC smoothing circuit including a power inductor and a capacitor and a radio-frequency inductor connected to the power inductor. The radio-frequency inductor includes the above-described inductor.

According to the present disclosure, an inductor in which no problem arises in terms of heat generation and heat dissipation and its resistance component is sufficiently reduced when it is used in a voltage converter and a voltage converter using it can be provided.

DETAILED DESCRIPTION

Embodiments for carrying out an inductor and a voltage converter using it according to the present disclosure are described below.

Figure 1A:
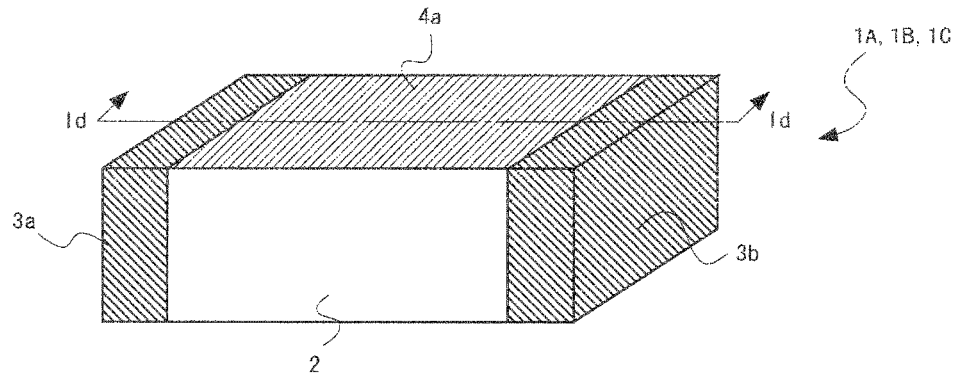
FIG. 1A is an external perspective view that illustrates a schematic configuration of an inductor according to each of first, second, and third embodiments of the present disclosure.

FIG. 1A is an external perspective view that illustrates a schematic configuration of an inductor 1A according to a first embodiment of the present disclosure. The inductor 1A is the one in which a pair of outer electrodes 3a and 3b are disposed on both end portions of an element assembly 2 made of an electrical insulating material. A heat-dissipating member 4a is disposed on a top of the element assembly 2 between the pair of outer electrodes 3a and 3b. The heat-dissipating member 4a is optional.

Figure 1B:
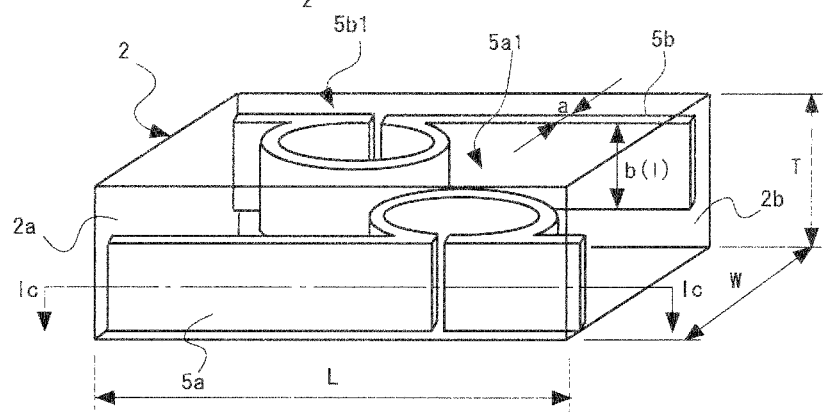
FIG. 1B is an internal transparent perspective view of an element assembly included in the inductor according to the first embodiment.

FIG. 1B is a transparent perspective view that illustrates the inside of the element assembly 2 included in the inductor 1A according to the first embodiment. In the element assembly 2, conductors 5a and 5b extend between a pair of end portions 2a and 2b of the element assembly 2. The pair of outer electrodes 3a and 3b disposed on the pair of end portions 2a and 2b of the element assembly 2 are electrically connected to end portions of the conductors 5a and 5b. In the present embodiment, the element assembly 2 is made of a magnetic material having a low magnetic permeability, for example, a relative permeability $\mu=5$, and its shape is a rectangular parallelepiped. The outer dimensions of the element assembly 2 are 1.0 [mm] in length L, 0.5 [mm] in width W, and 0.5 [mm] in thickness T. The configurations illustrated in the drawings are schematic, and the sizes and shapes of the sections are illustrated for facilitating the understanding.

Figure 1C:
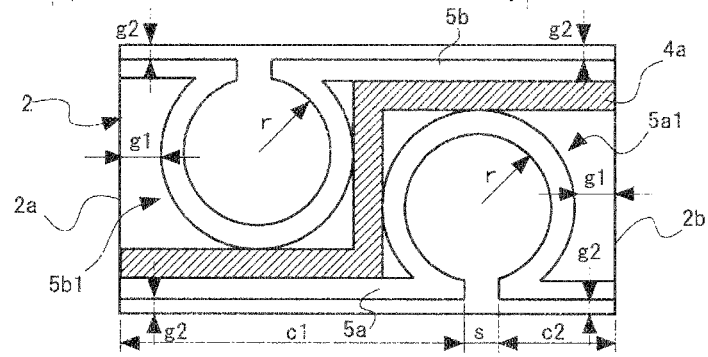
FIG. 1C is a cross-sectional view of the element assembly.

FIG. 1C is a cross-sectional view of the element assembly 2 cut at a horizontal plane containing line Ic-Ic illustrated in FIG. 1B seen in the direction of the arrows. Each of the conductors 5a and 5b is made of a flat-type wire whose cross section has a rectangular shape with a short side a (=50 μm) and a long side b (=450 μm), and the two wound conductors 5a and 5b are placed side by side between the pair of end portions 2a and 2b of the element assembly 2 and are connected in parallel with each other. In the present embodiment, the conductors 5a and 5b include cylindrical winding sections 5a1 and 5b1, respectively, whose internal diameter (=2r) is 290 μm. The cylindrical winding sections 5a1 and 5b1 are the sections in which the cylindrical spaces defined by the radius r and the height of the long side b are surrounded by the conductors 5a and 5b. Each of the cylindrical winding sections 5a1 and 5b1 is the one in which the flat-type wire in the long side b direction of the rectangular cross section is wound a specific number of turns about a thickness T direction (second direction) intersecting with a length L direction (first direction) connecting the pair of end portions 2a and 2b of the element assembly 2 along the thickness T direction. In the first embodiment, the number of turns is less than one. Here, a number of turns of one is the number of turns at which the start of the winding of each of the conductors 5a and 5b overlaps the end of the winding in the first turn as seen in the direction of the winding axis and is the number of turns at which the wire is wound just 360°. The number of turns less than one is the number of turns at which the winding does not reach 360°. In the case of the number of turns less than one, the start of the winding and the end of the winding of each of the conductors 5a and 5b do not overlap each other, and the winding sections do not overlap each other as seen in the direction of the winding axis.

The heat-dissipating member 4a is disposed inside the element assembly 2 between the conductors 5a and 5b with a wall shape having a thickness of 50 μm and is a partition between the conductors 5a and 5b. The heat-dissipating member 4a is in contact with the arc portions of the cylindrical winding sections 5a1 and 5b1 inside the element assembly 2, and both end portions thereof are in contact with the pair of outer electrodes 3a and 3b at the pair of end portions 2a and 2b of the element assembly 2.

Figure 1D:
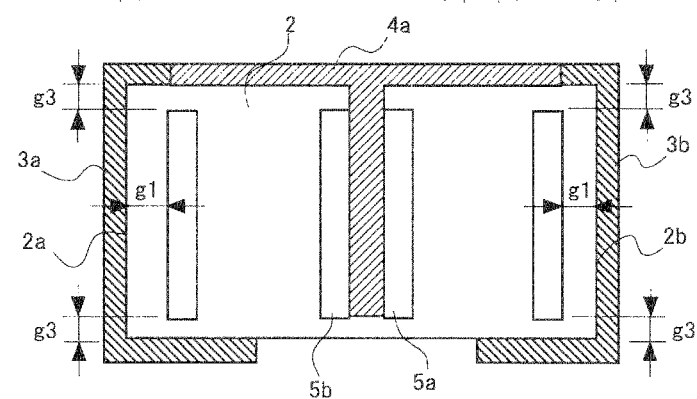
FIG. 1D is a longitudinal sectional view of the inductor according to the first embodiment.

FIG. 1D is a longitudinal sectional view of the inductor 1A cut at a vertical plane containing line Id-Id illustrated in FIG. 1A seen in the direction of the arrows. The heat-dissipating member 4a includes, in addition to the portion in contact with the cylindrical winding sections 5a1 and 5b1, a portion exposed on the top of the outer surface of the element assembly 2. In the present embodiment, nonmagnetic alumina is used as the material of the heat-dissipating member 4a, and its thermal conductivity is as high as 10 [W/(m·K)]. The heat-dissipating member 4a may also be exposed on both sides or the like of the outer surface of the element assembly 2. The material of the heat-dissipating member 4a is not limited to nonmagnetic materials and may be a magnetic material having high thermal conductivity.

The pair of outer electrodes 3a and 3b are in contact with both end portions of the conductors 5a and 5b extended to the pair of end portions 2a and 2b of the element assembly 2, and the pair of outer electrodes 3a and 3b are formed by the application of silver thereon, being baked on the pair of end portions 2a and 2b of the element assembly 2, and the application of nickel/tin plating thereon. Each of the outer electrodes 3a and 3b has an L shape in cross section, as illustrated, and has a wide portion that is near the bottom surface of the element assembly 2 and that can be in contact with a circuit substrate surface.

In the inductor 1A, the distances between the conductors 5a and 5b inside the element assembly 2 and the outer electrodes 3a and 3b, that is, side gaps g1, g2, and g3 (see FIGS. 1C and 1D) are set at predetermined distances. In the present embodiment, the side gap g3 between each of the conductors 5a and 5b and each of the top side and the bottom side of each of the outer electrodes 3a and 3b is set at 10 μm. The side gaps g1, g2, and g3 are related to stray capacitance in the inductor 1A, and the capacitance value of the stray capacitance can be adjusted by setting those side gaps at predetermined distances.

In the above-described inductor 1A according to the present embodiment, because the two wound conductors 5a and 5b are placed side by side between the pair of outer electrodes 3a and 3b, are connected in parallel with each other, and are made of a flat-type wire having a rectangular cross section, a direct-current resistance component Rdc occurring between the pair of outer electrodes 3a and 3b in the inductor 1A can be sufficiently reduced.

In particular, in the inductor 1A according to the present embodiment, because each of the conductors 5a and 5b is the one in which the flat-type wire in the long side b direction of the rectangular cross section is wound about the thickness T direction, which intersects with the length L direction, along the thickness T direction, a large dimension of the long side b of the rectangular cross section of the flat-type wire can be obtained in accordance with the dimension of the element assembly 2 in the thickness T direction. Accordingly, the direct-current resistance component Rdc in the inductor 1A is reduced by the amount corresponding to the large area of the cross section of each of the conductors 5a and 5b obtained in accordance with the dimension of the element assembly 2 in the thickness T direction.

Table 1 below provides a result of calculation of the direct-current resistance component Rdc in the inductor 1A according to the present embodiment based on the dimensions of the conductors 5a and 5b. Here, the conductors 5a and 5b are made of a copper wire. The thickness of the copper wire corresponds to the short side a of the flat-type wire, and the width of the copper wire corresponds to the long side b of the flat-type wire. The coil slit width s is the distance between the start and the end of the coil winding of each of the cylindrical winding sections 5a1 and 5b1. The copper-wire linear section length c is the length of the linearly formed portions in each of the conductors 5a and 5b (=c1+c2) (see FIG. 1C). The dimension in which the copper-wire linear section length c is added to the coil slit width s corresponds to the length L of the element assembly 2.

TABLE 1

| Direct-Current Resistance Value (Calculated Value) | Rdc [Ω] | 0.00071 |
|---|---|---|
| Copper Electric Resistivity | ρ [Ω/m] | $1.68 \times 10^{-8}$ |
| Copper Wire Thickness | a [m] | 0.00005 |
| Copper Wire Width | b [m] | 0.00045 |
| Coil Internal Diameter | r [m] | 0.000145 |
| Coil Slit Width | s [m] | 0.00001 |
| Copper Wire Linear Section Length | c [m] | 0.00099 |

As shown in Table 1 above, the direct-current resistance component Rdc in the inductor 1A according to the present embodiment is 0.71 [mΩ]. It is generally considered that when the direct-current resistance component Rdc in the inductor 1A is not more than 1 [mΩ] while an electric current of 10 [A] flows through the inductor 1A, heat generation by the passage of the electric current through the inductor 1A can be suppressed to a permissible value or less.

Accordingly, it can be considered that with the value 0.71 [mΩ] of the direct-current resistance component Rdc in the inductor 1A according to the present embodiment, the heat generation can be suppressed to a permissible value or less.

Table 2 below provides a result of calculation of the inductance value L of the inductor 1A according to the present embodiment. The inductance value L is the value in which the inductance values of the inductor including the two conductors 5a and 5b are combined. Here, the coupling coefficient between the conductors 5a and 5b is 0, and the number of turns N of each of the conductors 5a and 5b is 0.99. The coil length 1 is the distance in which a magnetic flux flows through the coil and corresponds to the length of the long side b of the flat-type wire.

TABLE 2

| L Value (Calculated Value) | L[nH] | 0.35 |
|---|---|---|
| Space Permeability | μ0 [H/m] | 1.26 × 10⁻⁶ |
| Relative Permeability | μ/μ0 | 5 |
| Number of Turns | N [—] | 0.99 |
| Nagaoka Coefficient | K [—] | 0.77 |
| Coil Length | l [m] | 0.00045 |
| Coil Internal Diameter | r [m] | 0.000145 |

The number of locations where the cylindrical winding sections 5a1 and 5b1 are disposed in the conductors 5a and 5b, respectively, is not limited to one, and the number of parallels of the conductors 5a and 5b is not limited to two. Those numbers are set at any numbers in accordance with the inductance value required for the inductor 1A. The inductance value of the inductor 1A can be set at a large value depending on the number of locations where the cylindrical winding sections 5a1 and 5b1 are placed.

With the inductor 1A according to the present embodiment, heat generated in the conductors 5a and 5b by the passage of an electric current radiates through the heat-dissipating member 4a in contact with the conductors 5a and 5b inside the element assembly 2 and the outer electrodes 3a and 3b to space outside the element assembly 2. As described above, the thermal conductivity of the heat-dissipating member 4a is 10 [W/(m·K)], which is sufficiently higher than a thermal conductivity of 5 [W/(m·K)] of ferrite being the material of the drum core included in the coil component in related art disclosed in Japanese Unexamined Patent Application Publication No. 2008-187043. Because of that difference in thermal conductivity, the presence of the heat-dissipating member 4a leads to improved thermal dissipation of the inductor 1A and suppressed temperature rise in the inductor 1A. Moreover, in the inductor 1A according to the present embodiment, the heat generated in the conductors 5a and 5b by the passage of the electric current also radiates through the portion of the heat-dissipating member 4a disposed on the top surface of the element assembly 2 and exposed on the outer surface of the element assembly 2. Thus, the heat dissipation of the inductor 1A can be further improved, and the temperature rise can be further suppressed.

Figure 2A:
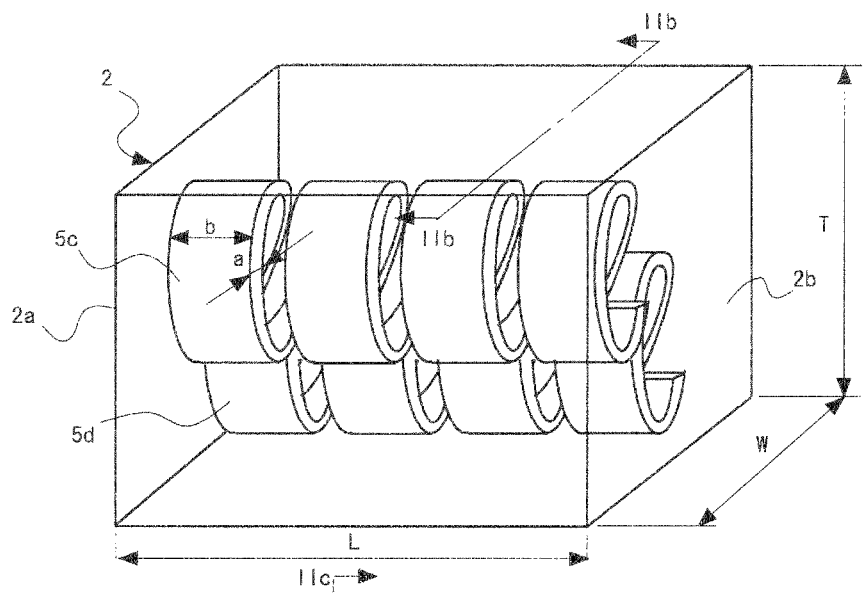
FIG. 2A is an internal transparent perspective view of an element assembly included in the inductor according to the second embodiment.

FIG. 2A is a transparent perspective view that illustrates the inside of the element assembly 2 included in an inductor 1B according to a second embodiment of the present disclosure. The inductor 1B according to the second embodiment differs from the inductor 1A according to the first embodiment in the shape of conductors 5c and 5d connected between the outer electrodes 3a and 3b inside the element assembly 2. The dimensions of the flat-type wire used in the conductors 5c and 5d are also different and are 50 μm in short side (thickness) a and 300 μm in long side (width). The outer dimensions of the element assembly 2 are also different and are 1.6 [mm] in length L, 0.8 [mm] in width W, and 0.8 [mm] in thickness T. The other configuration is the same as that of the inductor 1A according to the first embodiment, and its external perspective view is illustrated in FIG. 1A. The same or corresponding portions in FIGS. 2A-2C as those in FIGS. 1A-1D have the same reference numerals, and the description thereof is omitted.

In the inductor 1B according to the second embodiment, the two wound conductors 5c and 5d are also placed side by side between the pair of end portions 2a and 2b of the element assembly 2 and are connected in parallel with each other. In the present embodiment, the conductors 5c and 5d include cylindrical helical sections, respectively. As illustrated in FIG. 2A, each of the cylindrical helical sections is the one in which the flat-type wire in the long side b direction of the rectangular cross section is wound a number of turns of four about the length L direction connecting the pair of end portions 2a and 2b of the element assembly 2 along the length L direction. The internal diameter of the cylindrical portion of the cylindrical helical section is 275 μm.

Figure 2B:
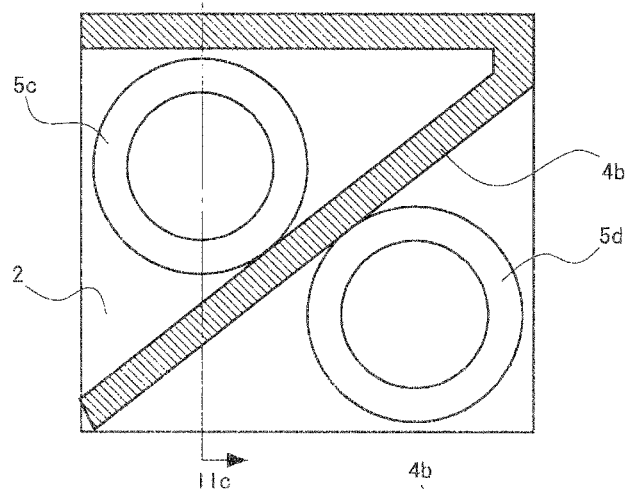
FIG. 2B is a side sectional view of the element assembly.

FIG. 2B is a side sectional view of the element assembly 2 cut at a vertical plane containing line IIb-IIb illustrated in FIG. 2A seen in the direction of the arrows. A heat-dissipating member 4b having an oblique wall shape is disposed inside the element assembly 2 between the conductors 5a and 5b and is a partition between the conductors 5c and 5d. The heat-dissipating member 4b includes a portion in contact with an arc portion of each of the cylindrical helical sections inside the element assembly 2 and also includes a portion exposed on the top of the outer surface of the element assembly 2.

Figure 2C:
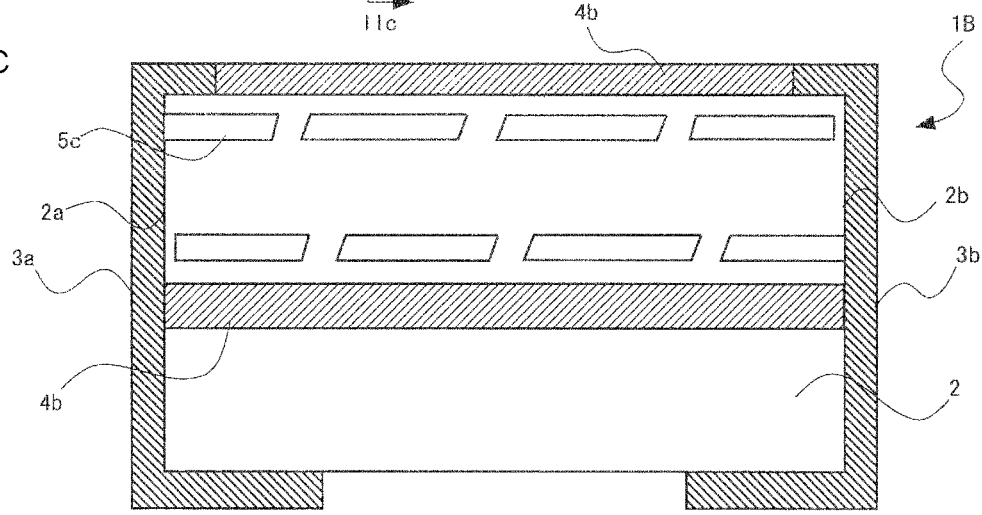
FIG. 2C is a front sectional view of the inductor according to the second embodiment.

FIG. 2C is a front sectional view of the inductor 1B cut at a vertical plane containing line IIc-IIc illustrated in FIG. 2B seen in the direction of the arrows. The pair of outer electrodes 3a and 3b are in contact with both end portions of the conductors 5c and 5d extended to the pair of end portions 2a and 2b of the element assembly 2. Both end portions of the heat-dissipating member 4b are in contact with the pair of outer electrodes 3a and 3b at the end portions 2a and 2b of the element assembly 2.

According to the above-described inductor 1B in the second embodiment, a large dimension of the flat-type wire in the long side b direction of the rectangular cross section can be obtained in accordance with the dimension of the element assembly 2 in the length L direction connecting the pair of end portions 2a and 2b of the element assembly 2 and the number of turns of each of the conductors 5c and 5d. Accordingly, the direct-current resistance component Rdc in the inductor 1B is reduced by the amount corresponding to the large area of the cross section of each of the conductors 5c and 5d obtained in accordance with the dimension of the element assembly 2 in the length L direction and the number of turns of each of the conductors 5c and 5d. Thus, with the inductor 1B in the second embodiment, like the inductor 1A according to the first embodiment, the direct-current resistance component Rdc occurring between the pair of outer electrodes 3a and 3b in the inductor 1B can also be sufficiently reduced. The heat dissipation of the inductor 1B can be improved, and the temperature rise in the inductor 1B can be suppressed.

The number of turns of each of the conductors 5c and 5d in the inductor 1B is not limited to four, and the number of parallels is also not limited to two. Those numbers are set at any numbers in accordance with the inductance value required for the inductor 1B. The inductance value of the inductor 1B can be set at a large value depending on the number of turns of each of the conductors 5c and 5d.

Figure 3A:
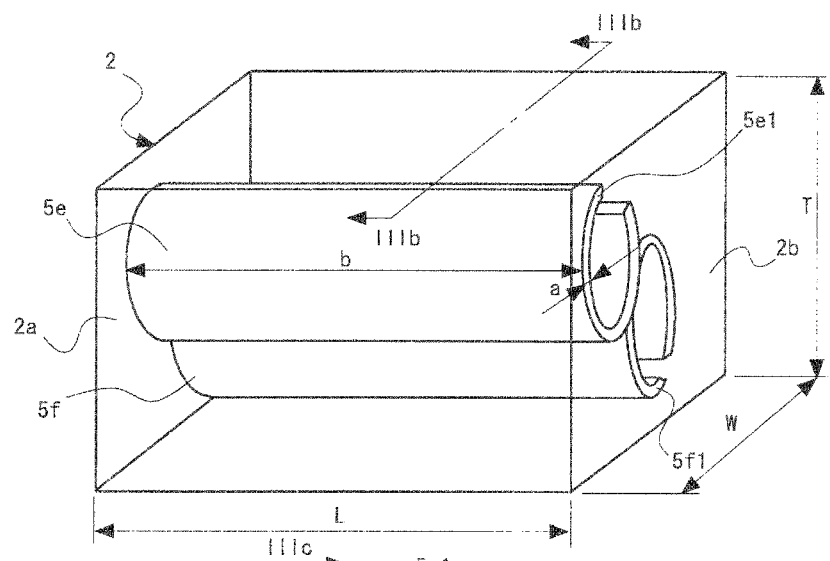
FIG. 3A is an internal transparent perspective view of an element assembly included in the inductor according to the third embodiment.

FIG. 3A is a transparent perspective view that illustrates the inside of the element assembly 2 included in an inductor 1C according to a third embodiment of the present disclosure. The inductor 1C according to the third embodiment differs from the inductor 1B according to the second embodiment in the shape of conductors 5e and 5f connected between the outer electrodes 3a and 3b inside the element assembly 2, in the dimensions of the short side a and the long side b of the flat-type wire used in the conductors 5e and 5f, and in the outer dimensions of the length L, thickness T, and width W of the element assembly 2. The other configuration is the same as that of the inductor 1B according to the second embodiment, and its external perspective view is illustrated in FIG. 1A. The same or corresponding portions in FIGS. 3A-3C as those in FIGS. 1A-1D have the same reference numerals, and the description thereof is omitted.

In the inductor 1C according to the third embodiment, the two wound conductors 5e and 5f are also placed side by side between the pair of end portions 2a and 2b of the element assembly 2 and are connected in parallel with each other. In the present embodiment, the conductors 5e and 5f include cylindrical winding sections, respectively. As illustrated in FIG. 3A, each of the cylindrical winding sections is the one in which the flat-type wire in the long side b direction of the rectangular cross section is wound the number of turns less than one about the length L direction connecting the pair of end portions 2a and 2b of the element assembly 2 along the length L direction. The number of conductors 5e and 5f connected in parallel is not limited to two and is set at any number in accordance with the inductance value required for the inductor 1C.

Figure 3B:
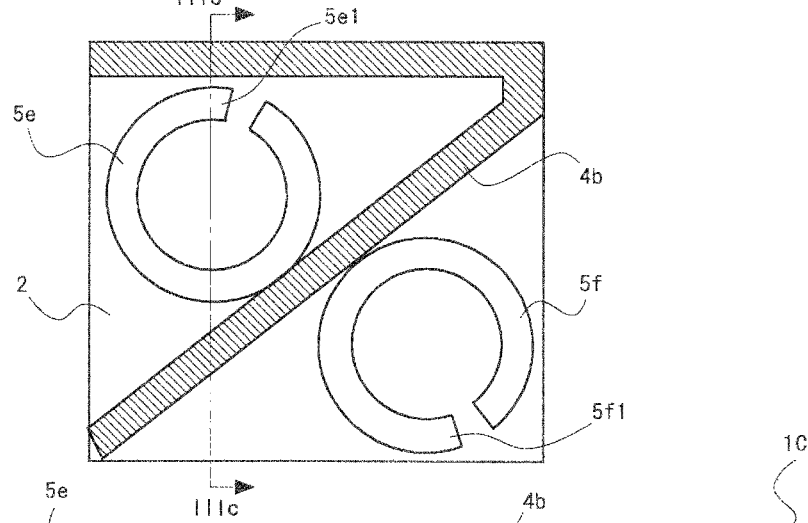
FIG. 3B is a side sectional view of the element assembly.

FIG. 3B is a side sectional view of the element assembly 2 cut at a vertical plane containing line IIIb-IIIb illustrated in FIG. 3A seen in the direction of the arrows. The heat-dissipating member 4b having an oblique wall shape is disposed inside the element assembly 2 between the conductors 5e and 5f and is a partition between the conductors 5e and 5f. The heat-dissipating member 4b includes a portion in contact with an arc portion of each of the cylindrical winding sections inside the element assembly 2 and also includes a portion exposed on the top of the outer surface of the element assembly 2.

Figure 3C:
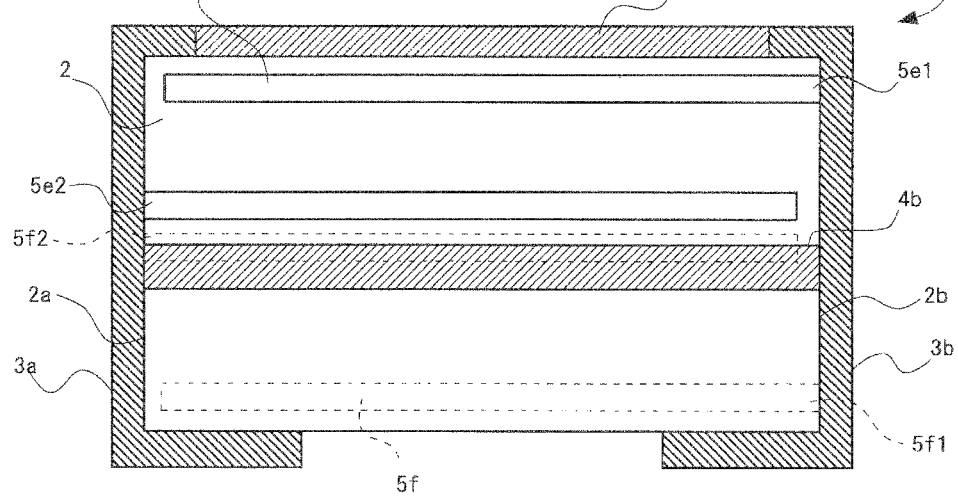
FIG. 3C is a front sectional view of the inductor according to the third embodiment.

FIG. 3C is a front sectional view of the inductor 1C cut at a vertical plane containing line IIIc-IIIc illustrated in FIG. 3B seen in the direction of the arrows. The pair of outer electrodes 3a and 3b are in contact with both end portions 5e1 and 5e2 of the conductor 5e and both end portions 5f1 and 5f2 of the conductor 5f extended in an unbalanced manner to the pair of end portions 2a and 2b of the element assembly 2. Both end portions of the heat-dissipating member 4b are in contact with the pair of outer electrodes 3a and 3b at the end portions 2a and 2b of the element assembly 2.

According to the above-described inductor 1C in the third embodiment, a large dimension of the flat-type wire in the long side b direction of the rectangular cross section can be obtained in accordance with the dimension of the element assembly 2 in the length L direction connecting the pair of end portions 2a and 2b of the element assembly 2. Accordingly, the direct-current resistance component Rdc in the inductor 1C is reduced by the amount corresponding to the large area of the cross section of each of the conductors 5e and 5f obtained in accordance with the dimension of the element assembly 2 in the length L direction. Thus, with the inductor 1C according to the third embodiment, like the inductor 1A according to the first embodiment, the direct-current resistance component Rdc occurring between the pair of outer electrodes 3a and 3b in the inductor 1C can also be sufficiently reduced. The heat dissipation of the inductor 1C can be improved, and the temperature rise in the inductor 1C can be suppressed.

Figure 4:
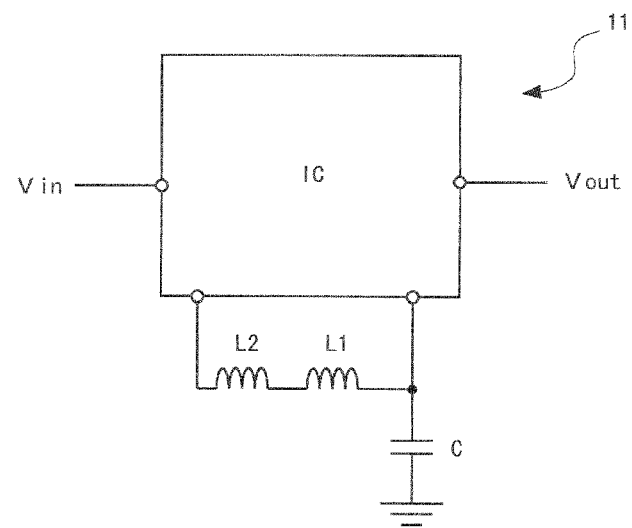
FIG. 4 is a circuit diagram of a DC-to-DC converter according to an embodiment of the present disclosure.

FIG. 4 is a circuit diagram of a DC-to-DC converter 11 using one of the above-described inductors 1A, 1B, and 1C as an RF inductor (radio-frequency inductor) L1 according to an embodiment of the present disclosure.

The DC-to-DC converter 11 is a voltage converter for converting one direct-current voltage into another between an input voltage Vin and an output voltage Vout. The DC-to-DC converter 11 includes an IC in which a switching element and a control section are integrated, the RF inductor L1, a power inductor L2, and a capacitor C. The power inductor L2 and the capacitor C constitute an LC smoothing circuit. The RF inductor L1 connected in series with the power inductor L2 constitutes a trap filter.

With the DC-to-DC converter 11 according to the present embodiment, because one of the above-described inductors 1A, 1B, and 1C, each of which direct-current resistance component Rdc is reduced, is used as the RF inductor L1, noise in the radio frequency range can be efficiently suppressed by the trap filter including the RF inductor L1, and the power conversion efficiency of the DC-to-DC converter 11 can be improved.

To attempt to improve the power conversion efficiency of the DC-to-DC converter 11, because the power inductor L2 has a large inductance value (L value) and its direct-current resistance component Rdc is larger than that of the RF inductor L1, in terms of losses in inductors, it has been sufficient to focus on only the loss in the power inductor L2 in related art. Recently, however, as the switching frequency of the switching element in the DC-to-DC converter 11 has become higher, the inductance value of the power inductor L2 has become increasingly lower, and the loss in the RF inductor L1 has become non-negligible. In the DC-to-DC converter 11 according to the present embodiment, the use of one of the inductors 1A, 1B, and 1C as the RF inductor L1 enables improvement in power conversion efficiency of the DC-to-DC converter 11.

In the DC-to-DC converter 11 according to the present embodiment, the capacitance value of the stray capacitance occurring between the conductors 5a, 5b, 5c, 5d, 5e, and 5f and the outer electrodes 3a and 3b inside the element assembly 2 in the RF inductor L1 is adjusted in accordance with predetermined distances set as the side gaps g between the conductors 5a, 5b, 5c, 5d, 5e, and 5f and the outer electrodes 3a and 3b. Accordingly, the range of frequencies of noise reduced by the trap filter (trap frequencies) is not adjusted by the coil component disclosed in Japanese Unexamined Patent Application Publication No. 2008-187043, whereas it is adjusted by the DC-to-DC converter 11 according to the present embodiment to a self resonant frequency (SRF) range of the RF inductor L1 by adjusting the stray capacitance.

The DC-to-DC converter 11 according to the present embodiment is suited for the use in a power source or the like for a wireless communication IC complying with the Bluetooth Low Energy (BLE) standard. In that use, the self resonant frequency of the RF inductor L1 is adjusted to 2.4 GHz, and radio-frequency noise in the 2.4 GHz range is reduced by the trap filter.

What is claimed is:

1. An inductor comprising:
   an element assembly made of an electrical insulating material;
   a plurality of conductors disposed inside the element assembly and extending between a pair of end portions of the element assembly, each of the plurality of conductors is made of a flat-type wire having a rectangular cross section and includes a cylindrical winding section wound a specific number of turns, each of the plurality of conductors having at least part of one long side surface spaced apart from and facing each other, and the plurality of conductors are connected in parallel with each other; and
   a pair of outer electrodes disposed on the pair of end portions of the element assembly and electrically connected to end portions of the conductors.

2. The inductor according to claim 1, wherein
   each of the conductors includes a cylindrical winding section in which the flat-type wire in a longitudinal direction of the rectangular cross section is wound a number of turns less than one about a second direction intersecting with a first direction connecting the pair of end portions along the second direction.

3. The inductor according to claim 1, wherein
   each of the conductors includes a cylindrical helical section in which the flat-type wire in a longitudinal direction of the rectangular cross section is wound a number of turns more than one about a first direction connecting the pair of end portions along the first direction.

4. The inductor according to claim 1, wherein
   each of the conductors includes a cylindrical winding section in which the flat-type wire in a longitudinal direction of the rectangular cross section is wound a number of turns less than one about a first direction connecting the pair of end portions along the first direction.

5. The inductor according to claim 1, further comprising:
   a heat-dissipating member in contact with the outer electrodes and disposed between the conductors.

6. The inductor according to claim 5, wherein
   the heat-dissipating member includes a portion exposed on an outer surface of the element assembly.

7. The inductor according to claim 1, wherein
   a distance between each of the conductors and each of the outer electrodes inside the element assembly is set at a predetermined distance.

8. A voltage converter for converting voltage between an input voltage and an output voltage, the voltage converter comprising an LC smoothing circuit including a power inductor and a capacitor; and a radio-frequency inductor connected to the power inductor,
   wherein the radio-frequency inductor comprises the inductor according to claim 1.

9. The inductor according to claim 2, further comprising:
   a heat-dissipating member in contact with the outer electrodes and disposed between the conductors.

10. The inductor according to claim 3, further comprising:
    a heat-dissipating member in contact with the outer electrodes and disposed between the conductors.

11. The inductor according to claim 4, further comprising:
    a heat-dissipating member in contact with the outer electrodes and disposed between the conductors.

12. The inductor according to claim 2, wherein
    a distance between each of the conductors and each of the outer electrodes inside the element assembly is set at a predetermined distance.

13. The inductor according to claim 3, wherein
    a distance between each of the conductors and each of the outer electrodes inside the element assembly is set at a predetermined distance.

14. The inductor according to claim 4, wherein
    a distance between each of the conductors and each of the outer electrodes inside the element assembly is set at a predetermined distance.

15. The inductor according to claim 5, wherein
    a distance between each of the conductors and each of the outer electrodes inside the element assembly is set at a predetermined distance.

16. The inductor according to claim 6, wherein
    a distance between each of the conductors and each of the outer electrodes inside the element assembly is set at a predetermined distance.

17. A voltage converter for converting voltage between an input voltage and an output voltage, the voltage converter comprising an LC smoothing circuit including a power inductor and a capacitor; and a radio-frequency inductor connected to the power inductor,
    wherein the radio-frequency inductor comprises the inductor according to claim 2.

18. A voltage converter for converting voltage between an input voltage and an output voltage, the voltage converter comprising an LC smoothing circuit including a power inductor and a capacitor; and a radio-frequency inductor connected to the power inductor,
    wherein the radio-frequency inductor comprises the inductor according to claim 3.

19. An inductor comprising:
    an element assembly made of an electrical insulating material;
    a plurality of conductors disposed inside the element assembly and extending between a pair of end portions of the element assembly, each of the plurality of conductors is made of a flat-type wire having a rectangular cross section and includes a cylindrical winding section in which the flat-type wire in a longitudinal direction of the rectangular cross section is wound a number of turns less than one about a second direction intersecting with a first direction connecting the pair of end portions along the second direction, and the plurality of conductors are connected in parallel with each other; and
    a pair of outer electrodes disposed on the pair of end portions of the element assembly and electrically connected to end portions of the conductors.

20. An inductor comprising:
    an element assembly made of an electrical insulating material;
    a plurality of conductors disposed inside the element assembly and extending between a pair of end portions of the element assembly, each of the plurality of conductors is made of a flat-type wire having a rectangular cross section and each of the conductors includes a cylindrical winding section in which the flat-type wire in a longitudinal direction of the rectangular cross section is wound a number of turns less than one about a first direction connecting the pair of end portions along the first direction, and the plurality of conductors are connected in parallel with each other; and a pair of outer electrodes disposed on the pair of end portions of the element assembly and electrically connected to end portions of the conductors.

* * * * *